United States Patent
Venkatraman

(10) Patent No.: US 9,071,935 B2
(45) Date of Patent: *Jun. 30, 2015

(54) SELF POSITIONING OF A WIRELESS STATION

(71) Applicant: QUALCOMM Incorporated, San Diego, CA (US)

(72) Inventor: SaiPradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,259

(22) Filed: Dec. 9, 2013

(65) Prior Publication Data
US 2014/0099977 A1    Apr. 10, 2014

Related U.S. Application Data

(63) Continuation of application No. 12/950,950, filed on Nov. 19, 2010, now Pat. No. 8,606,188.

(51) Int. Cl.
| | |
|---|---|
| *H04M 1/00* | (2006.01) |
| *H04W 4/02* | (2009.01) |
| *G01S 5/02* | (2010.01) |
| *H04W 64/00* | (2009.01) |

(52) U.S. Cl.
CPC .............. *H04W 4/023* (2013.01); *G01S 5/0236* (2013.01); *G01S 5/0242* (2013.01); *H04W 64/003* (2013.01)

(58) Field of Classification Search
USPC .......... 455/67.11, 456.1, 456.3, 404.2, 550.1; 340/539.2, 539.13, 539.15; 342/357.2, 342/357.25, 357.34
See application file for complete search history.

(56) References Cited

U.S. PATENT DOCUMENTS

| | | |
|---|---|---|
| 7,127,257 B2 | 10/2006 | Riley et al. |
| 7,130,646 B2 | 10/2006 | Wang |
| 7,305,245 B2 | 12/2007 | Alizadeh-Shabdiz et al. |
| 7,403,762 B2 | 7/2008 | Morgan et al. |
| 7,414,988 B2 | 8/2008 | Jones et al. |

(Continued)

FOREIGN PATENT DOCUMENTS

| | | |
|---|---|---|
| JP | 2010130533 A | 6/2010 |
| WO | 03058985 A2 | 7/2003 |

(Continued)

OTHER PUBLICATIONS

International Preliminary Report on Patentability—PCT/US2011/057529, The International Bureau of WIPO—Geneva, Switzerland, Nov. 19, 2012.

(Continued)

*Primary Examiner* — Tuan H Nguyen
(74) *Attorney, Agent, or Firm* — Bever, Hoffman & Harms, LLP

(57) ABSTRACT

A self-positioning mechanism is provided that determines and tracks the position of an access point in real time. A location unaware access point determines its location from the locations of location aware stations. The location is determined based on a predicted estimate which is updated based on measured values of the locations of the location aware stations over a time period. The movement of the location is then tracked based on the differences between range measurements of the location aware stations.

21 Claims, 7 Drawing Sheets

(56) References Cited

U.S. PATENT DOCUMENTS

| | | |
|---|---|---|
| 7,433,694 B2 | 10/2008 | Morgan et al. |
| 7,471,954 B2 | 12/2008 | Brachet et al. |
| 7,474,897 B2 | 1/2009 | Morgan et al. |
| 7,493,127 B2 | 2/2009 | Morgan et al. |
| 7,551,579 B2 | 6/2009 | Alizadeh-Shabdiz et al. |
| 7,551,929 B2 | 6/2009 | Alizadeh-Shabdiz et al. |
| 7,800,531 B2 | 9/2010 | Wang et al. |
| 7,974,639 B2 | 7/2011 | Burroughs et al. |
| 8,031,067 B2 | 10/2011 | Greenberg |
| 8,606,188 B2 | 12/2013 | Venkatraman |
| 2004/0198386 A1 | 10/2004 | Dupray |
| 2005/0124355 A1 | 6/2005 | Cromer et al. |
| 2007/0015516 A1 | 1/2007 | Huotari et al. |
| 2007/0077945 A1 | 4/2007 | Sheynblat |
| 2007/0121560 A1 | 5/2007 | Edge |
| 2008/0045233 A1 | 2/2008 | Fitzgerald |
| 2008/0065287 A1 | 3/2008 | Han et al. |
| 2008/0227462 A1 | 9/2008 | Freyman et al. |
| 2008/0299992 A1 | 12/2008 | Eitan et al. |
| 2009/0002188 A1* | 1/2009 | Greenberg ............... 340/686.1 |
| 2009/0042557 A1 | 2/2009 | Vardi et al. |
| 2009/0224967 A1* | 9/2009 | Wang et al. ............... 342/357.1 |
| 2010/0271263 A1 | 10/2010 | Moshfeghi |

FOREIGN PATENT DOCUMENTS

| | | |
|---|---|---|
| WO | 2007025159 A2 | 3/2007 |
| WO | 2009017877 A2 | 2/2009 |

OTHER PUBLICATIONS

International Search Report and Written Opinion—PCT/US2011/057529—ISA/EPO—Mar. 14, 2012.

Kotanen A., et al., "Experiments on Local Positioning with Bluetooth," Information Technology: Coding and Computing [Computers and Communications], 2003 Proceedings ITCC 2003, International Conference on Apr. 2003, 7 pages.

* cited by examiner

SELF POSITIONING OF A WIRELESS STATION

RELATED APPLICATIONS

This application is a Continuation of U.S. patent application Ser. No. 12/950,950 entitled "Self-Positioning Of A Wireless Station" filed Nov. 19, 2010.

BACKGROUND

Embodiments of the subject matter relate generally to communications, and more particularly to techniques for determining and continuously tracking the position of a wireless station.

There is an increased trend for wireless devices to employ location-based services. These location-based services provide a user of a wireless device with information accessible through a wireless network. The location-based service relies on the geographical position of the wireless device. Examples of such information can be the local weather information, driving directions, entertainment services, and the like. The geographical location of a wireless device is based on a known coordinate system (e.g., WGS84) that is used in a particular positioning system. Examples of such positioning systems include the global positioning system (GPS) and the terrestrial positioning systems used in cellular networks (e.g., GSM).

A typical wireless network employs one or more access points to connect the wireless devices through a wired medium, such as the Ethernet, to a larger communications network, such as the Internet. Each access point has a location that is associated with a particular positioning system. The location can be a GPS position, a GSM location, or the like. Most access points are not aware of their locations and obtain it through manual configuration.

Furthermore, access points are located in a variety of places, such as public parks, restaurants, private business, airports, libraries, etc. The location of some of these access points can be stationary. In some cases, the location of an access point changes as the access point moves. This movement requires that the location of the access point be updated. Accordingly, a need arises for automatically determining and tracking the location of an access point.

SUMMARY

Various embodiments are presented of a self-positioning apparatus and method that enables an access point to determine and track its location within a positioning system, in real time. An access point has a location that is based on a coordinate system within a positioning system. The positioning system can be a wireless communication system or a satellite constellation. An access point, not knowing its location, is referred to as a location unaware access point. The location unaware access point can learn its position using information obtained from location aware stations that are within range of the location unaware access point.

The access point learns its position by utilizing an Extended Kalman Filter (EKF). An EKF estimates the location, or state, of a discrete-time controlled system that is governed by a non-linear stochastic differentiable function from noisy measurements. The EKF starts with an initial state estimate and covariance that is derived from the locations of location aware stations for an initial time step. The initial state estimate is used to determine a predicted state and a predicted covariance. The predicted state estimate and covariance are refined using range measurements of the location aware stations at each time step thereby producing an output state and output covariance at each time step. The predicted state estimate and the output state are computed for each time step until the difference between them reaches a user-defined error tolerance.

The access point tracks movement from its position by comparing a test statistic with a threshold at a particular confidence level. When the movement is confirmed, the access point re-computes its position.

BRIEF DESCRIPTION OF THE DRAWINGS

The subject matter disclosed is illustrated by way of example, and not by way of limitation, in the figures of the accompanying drawings in which the like reference numerals refer to similar elements and in which.

DETAILED DESCRIPTION

Figure 1:
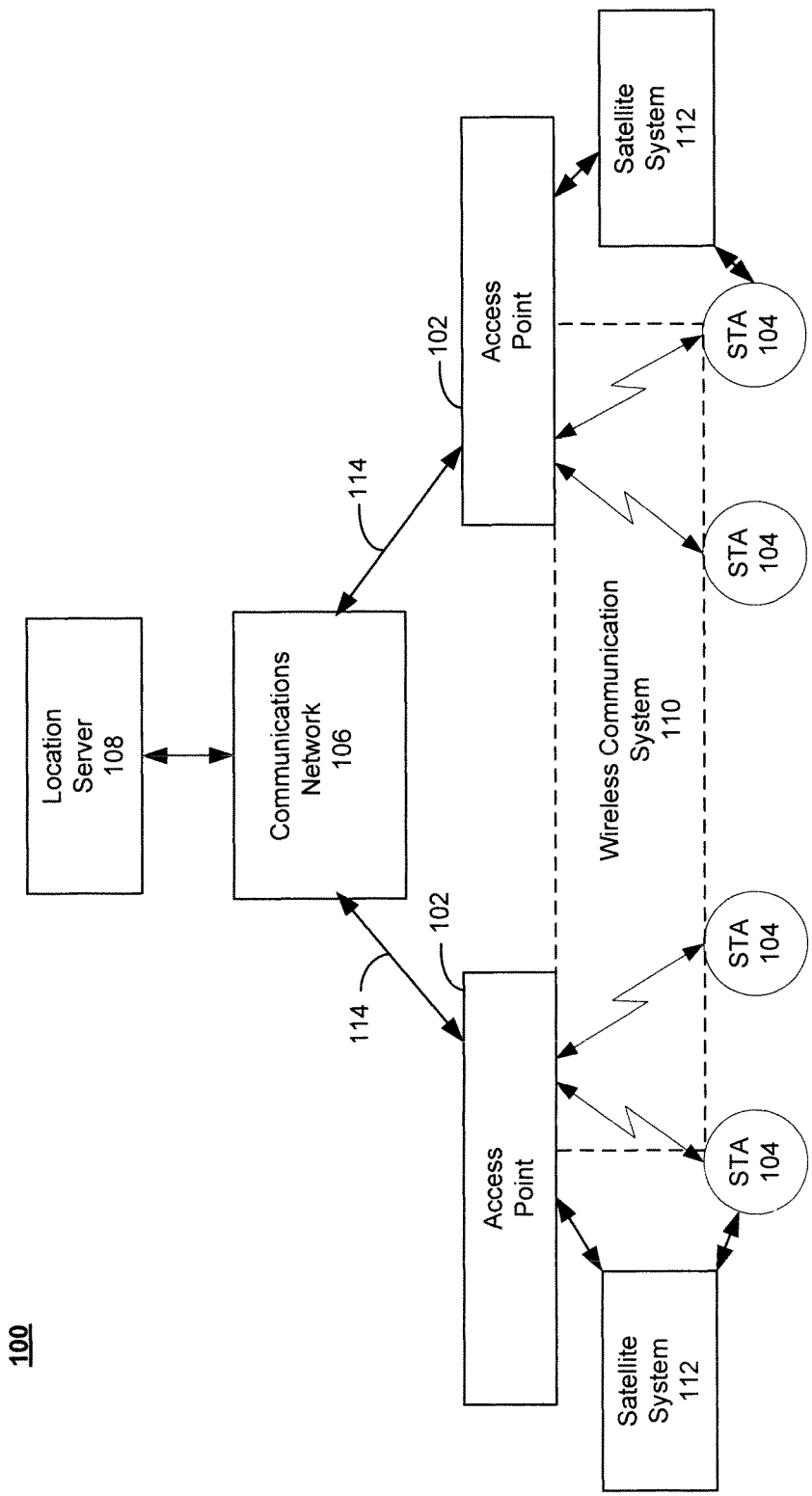
FIG. 1 is a block diagram illustrating an exemplary configuration of a communications system in accordance with some embodiments.

FIG. 1 illustrates an exemplary configuration of a communications system 100 for use in some embodiments. There is shown a communications system 100 having one or more access points 102 in communication with one or more stations 104 through a wireless communication system 110. Each access point 102 is coupled to a communications network 106, through a wired link 114. A location server 108 can also be coupled to the communications network 106. Each of the access points 102 and stations 104 can be coupled to a satellite system 112.

An access point 102 is a bridge having the capability to connect wireless devices with a communications network 106. Typically, the access point 102 is coupled to the communications network 106 through a wired link, such as coaxial cable twisted pair using Ethernet networking protocols. The communications network 106 can be any type of network structured in any configuration, such as, without limitation, the Internet.

Each station 104 can be any type of wireless device, such as without limitation, cellular phones, PDAs, personal computers, servers, any type of computing device, and the like. Each access point 102 communicates with one or more stations 104 through a wireless communication system 110. In some embodiments, an access point 102 is associated with a location within the coordinate system used in a cellular network. The access point 102 can utilize the technology described herein to determine its location within that coordinate system without directly receiving it from the wireless communication system 110.

In a wireless communication system operating in accordance with the IEEE 802.11 standard, access points and stations communicate through transmissions referred to as frames. Access points periodically transmit beacon frames to announce their existence and to relay information regarding their identification and location. Stations typically monitor the radio channels and listen for the beacon frames or beacons that are within range. A station associates with an access point to obtain access to the communications network 106 and the services provided by it. A station uses an association request frame to associate with an access point. The access point sends an association response frame back to the station containing an acceptance or rejection of the association request.

A station or access point transmits a probe request frame when it needs information from another station or access point. The access point or station responding to the probe request frame responds by sending a probe response frame containing the requested information.

Each access point 102 and station 104 can communicate with one or more satellites in the satellite system (also referenced as a global navigation satellite system (GNSS)) 112, such as GPS, GLONASS, and the like. If an access point has a GPS receiver, the access point can determine its location from the GNSS. However, if the GPS receiver is not able to receive signals, the access point can utilize the technology described herein to determine its location.

Figure 2:
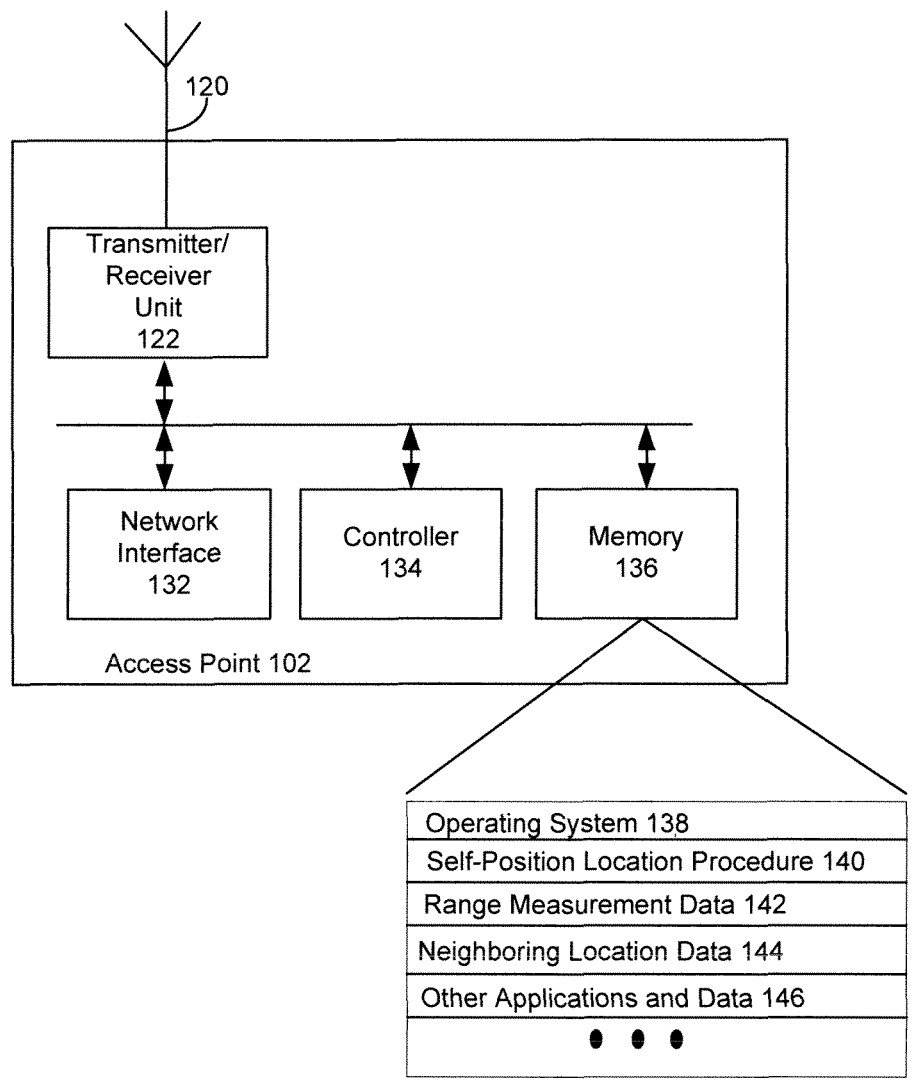
FIG. 2 is a block diagram illustrating an exemplary configuration of an access point in accordance with some embodiments.

FIG. 2 shows an exemplary configuration of an access point 102. There is shown an access point 102 having at least one antenna 120 coupled to a transmitter/receiver unit 122, a network interface 132, a controller 134, and a memory 136. The antenna 120 is coupled to the transmitter/receiver unit 122 and is used to transmit and receive WiFi signals. The transmitter/receiver unit 122 can include satellite circuitry (not shown) for receiving and transmitting signals to the satellite system 112 (FIG. 1). In addition, the transmitter/receiver unit 122 can include WiFi circuitry (not shown) for receiving and transmitting, through the antenna 120, wireless signals to the wireless communication system 110 (FIG. 1). The network interface 132 is used to communicate through the wired link 114 with the communications network 106, the controller 134 manages and controls processing within the access point, and the memory 136 is used to store instructions and data used in the operation of the access point 102.

The memory 136 is a non-transitory computer readable medium that can store executable procedures, code, applications, and data. It can be any type of memory device (e.g., random access memory, read-only memory, flash memory, etc.), magnetic storage, volatile storage, non-volatile storage, optical storage, DVD, CD, and the like. The memory 136 can contain instructions and data as follows:
 an operating system 138;
 a self-position location procedure 140;
 range measurement data from location aware stations 142;
 location data from location aware stations 144; and
 other applications and data 146.

Figure 3:
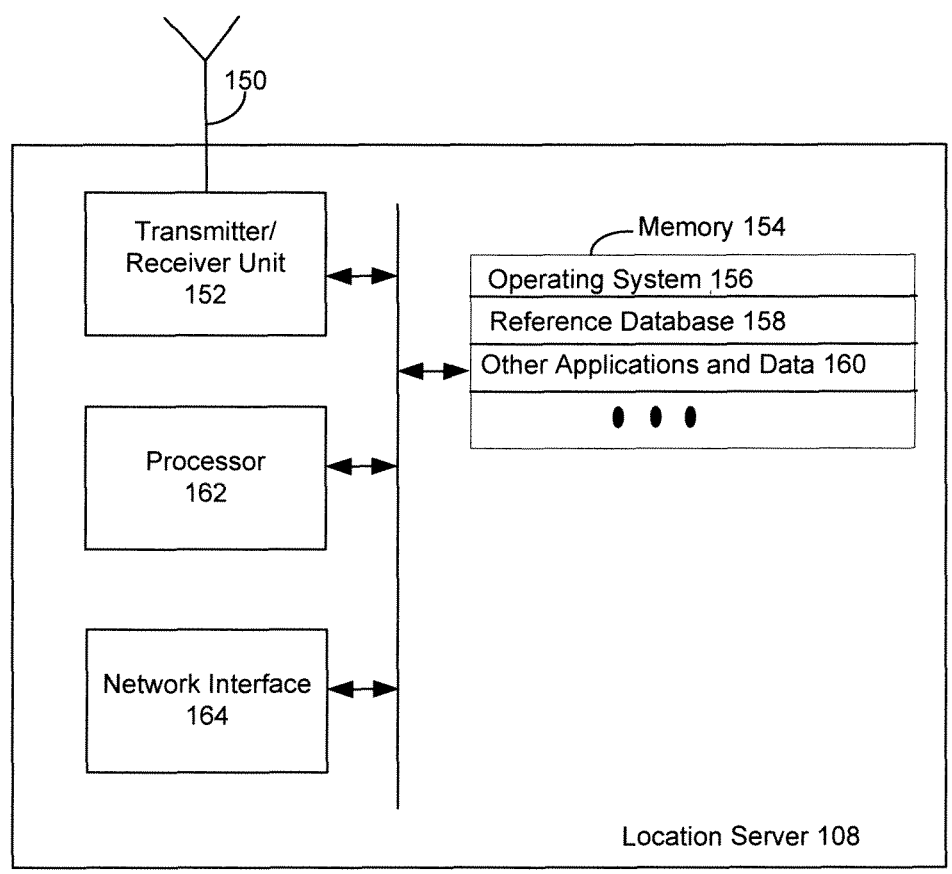
FIG. 3 is a block diagram illustrating an exemplary configuration of a location server in accordance with some embodiments.

Referring back to FIG. 1, a location server 108 is a computing device that is in communication with the access points 102 (and thus stations 104) through the communications network 106. The location server 108 can be any type of computing device, such as without limitation, server, personal computer, PDA, cell phone, etc. The location server 108 can be used to store the locations of the various access points and stations in a reference database and to provide additional computing and resources as needed. Referring to FIG. 3, the location server 108 can include, at least, an antenna 150 coupled to a transmitter/receiver unit 152, a processor 162 that controls the operation of the location server 108, a network interface 164 for communicating with the communications network 106, and a memory 154. The memory 154 is a non-transitory computer readable medium that can store executable procedures, code, applications, and data. It can be any type of memory device (e.g., random access memory, read-only memory, flash memory, etc.), magnetic storage, volatile storage, non-volatile storage, optical storage, DVD, CD, and the like. The memory 154 can contain instructions and data as follows:
 an operating system 156;
 a reference database 158 that stores the locations of the various stations and access points and/or measurement data; and
 other applications and data 160.

Attention now turns to embodiments of the self-positioning methodology utilized by the communications system described above.

The self-positioning process uses an estimation technique referred to as an Extended Kalman Filter (EKF) to estimate the location of an access point. An EKF estimates the state of a discrete-time controlled system that is governed by a non-linear stochastic differentiable function from noisy measurements. In essence, the methodology estimates the state of the system, which cannot be measured, by measuring a variable that is a function of the state and which is corrupted with noise.

The state of the system is the unknown position of an access point. The EKF represents the state of the system by state equations at each time step k and by output equations at each time step k. A state equation is governed by a difference equation or transition model, $f(\bullet)$ which relates the state at time step k−1 to the current step k. The state equation at time step k is represented mathematically as follows:

$$x_k = f(x_{k-1}) + w_{k-1}$$

where
 $x_k$ is the state at time step k,
 $f(\bullet)$ is a state transition model (linear or non-linear) and
 $w_k$ is the process noise vector which is drawn from a Gaussian distribution with zero mean with covariance $Q_k$ ($w_k \sim N(0, Q_k)$), where $Q_k$ is the process noise covariance matrix.

The output equation represents the measurement of the state of system at time step k as a function of a non-linear difference equation or transition model, $h(\bullet)$, taking into consideration the measurement noise. The output equation at time step k is represented mathematically as follows:

$$z_k = h(x_k) + v_k$$

where
 $Z_k$ is the measurement of the state of $x_k$,
 $h(\bullet)$ is a non-linear measurement transition model which maps the state space into the measurement space, and
 $V_k$ is the measurement noise which is drawn from a Gaussian distribution with zero mean with covariance $R_k$ ($V_k \sim N(0, R_k)$), where $R_k$ is the measurement noise covariance matrix.

The state at time step k is represented as $x_k$. The state x can be represented mathematically as a vector, where each entry in the vector represents the locations. For example, the state vector x can a three-dimensional vector represented by the tuple (latitude, longitude, altitude), a two-dimensional vector represented as (latitude, longitude), or any other representation used within a geographical coordinate system.

The Extended Kalman Filter consists of two phases: a predict phase and an update phase. In the predict phase, a predicted state estimate at the current time step k is estimated from the previous time step k−1. The predicted state estimate does not include measurement data observed at the current time step k. The second phase is an update phase where the predicted state estimate is combined with the measurement data observed at the current time step to produce a refined state estimate. The predict phase and the update phase are repeated or reiterated for each time step over a time period until the state estimate converges within a predetermined error tolerance.

The predict phase generates the predicted state and its corresponding predicted covariance as follows:

$$\text{Predicted state } \hat{x}_{k|k-1} = x_{k-1|k-1} \quad (1)$$

$$\text{Predicted covariance } P_{k|k-1} = P_{k-1|k-1} + Q_{k-1} \quad (2)$$

where
k=time step,
$x_k$=state at time step k,
$Q_k$=process noise covariance matrix at time step k.

The update phase generates the updated state and its covariance as follows:

$$\text{Innovation } \tilde{y}_k = z_k - h(\hat{x}_{k|k-1}) \quad (3)$$

$$\text{Innovation Covariance } S_k = H_k P_{k|k-1} H_k^T + R_k \quad (4)$$

$$\text{Kalman Gain } K_k = P_{k|k-1} H_k^T S_k^{-1} \quad (5)$$

$$\text{Updated State } \hat{x}_{k|k} = \hat{x}_{k|k-1} + K_k \tilde{y}_k \quad (6)$$

$$\text{Updated Covariance } P_{k|k} = (I - K_k H_k) P_{k|k-1} \quad (7)$$

where
$z_k$ is the measurement matrix and is represented mathematically as $z_k = h(x_k) + v_k$, where $v_k$ is the measurement noise,
$H_k$ is the Jacobian matrix of the partial derivatives of h with respect to x and is represented mathematically as $$H_k = \left.\frac{\partial h}{\partial x}\right|_{\hat{x}_{k|k-1}},$$

$R_k$ is the measurement noise covariance matrix, and
I is the identity matrix.

Attention now turns to a more detailed description of the use of the EKF in the self-positioning methodology.

Figure 4:
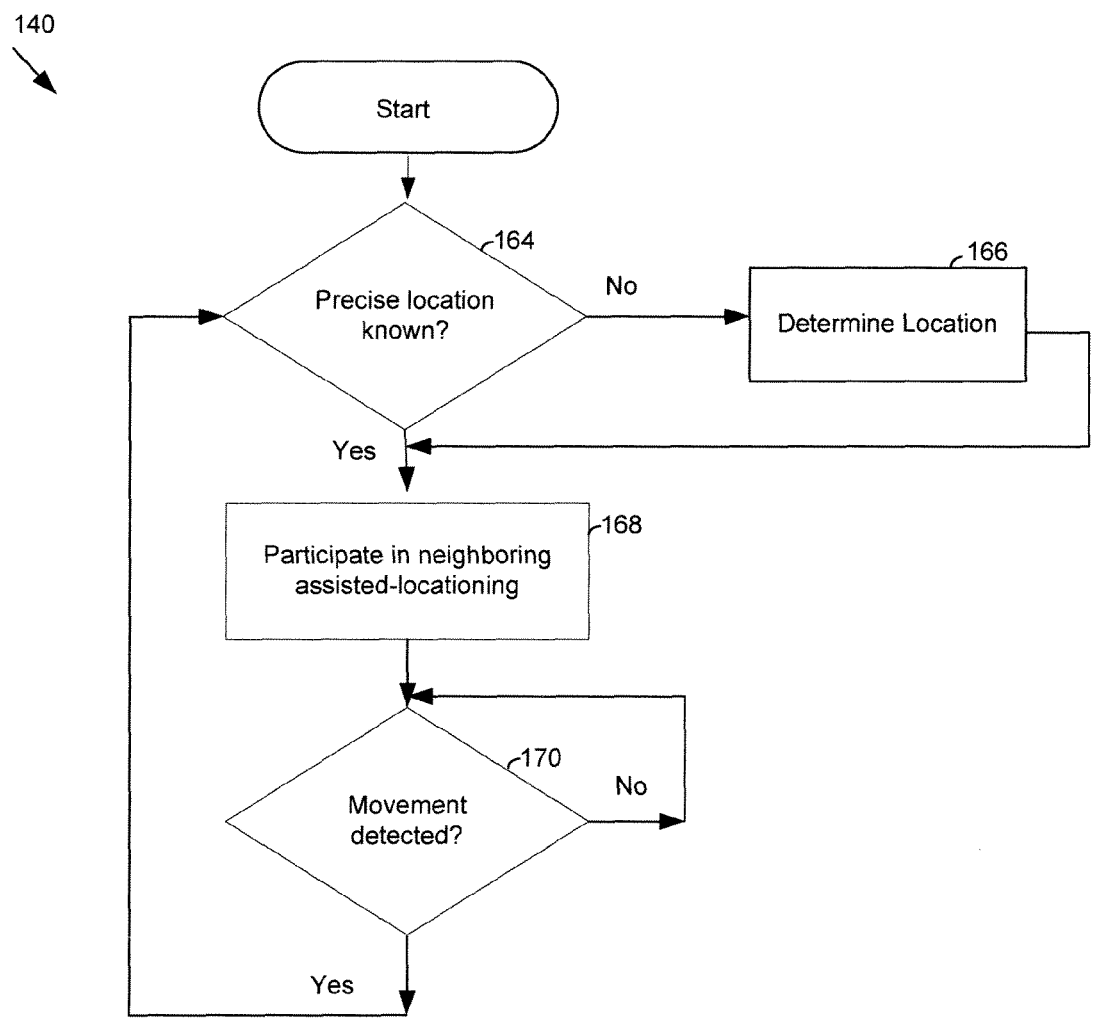
FIG. 4 is an exemplary flow diagram illustrating a method for determining and tracking a location of a wireless station in accordance with some embodiments.

Referring to FIG. 4, the self-positioning procedure 140 starts by determining whether the precise location of the access point is known (step 164). A precise location is a location that the access point determined directly from a positioning system and not estimated based on position data from its associated stations. In the event the precise location of the access point is known (step 164—Yes), the access point can participate in assisting its stations in their self-positioning (step 168) and in tracking for any movement from its location (step 170). Steps 168 and 170 are described in more detail below.

Figure 5:
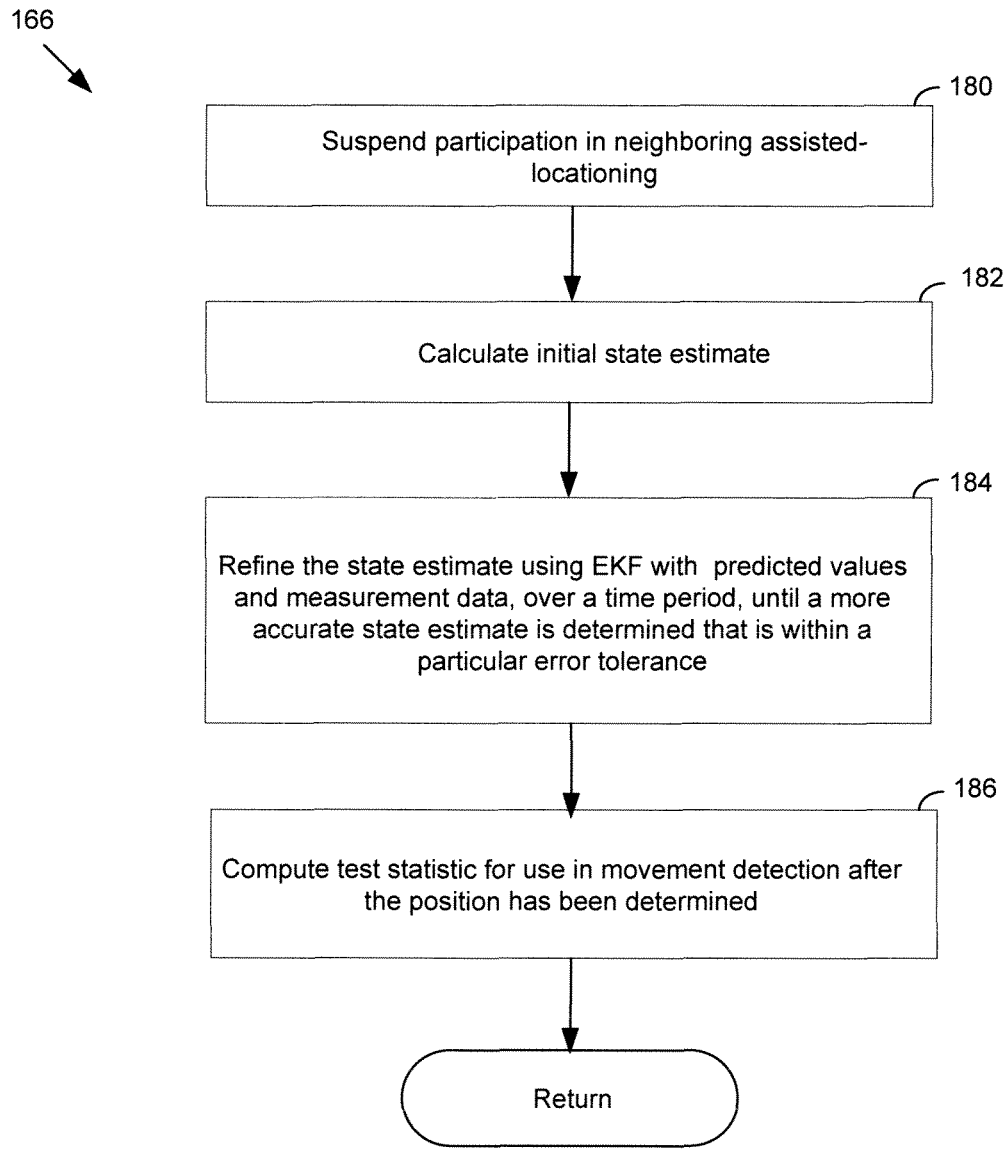
FIG. 5 is an exemplary flow diagram illustrating a method for determining a location of a wireless station in accordance with some embodiments.

When the precise location is unknown (step 164—No), the procedure 140 embarks on determining its own location (step 166). Turning to FIG. 5, since the access point does not know its location, the access point is configured to suspend its participation in assisting its stations in determining their location (step 180).

Next, an initial state estimate, $\hat{x}_0$, and the corresponding initial state error covariance, $P_0$, is calculated in order to initialize the EKF (step 182). In an embodiment, the initial state estimate is determined from the locations of the location aware stations. In some embodiments, the location unaware access point can obtain these locations using the broadcast frames described in the U.S. patent application entitled, "Management-Packet Communication of GPS Satellite Positions", assigned to QUALCOMM Incorporated, application Ser. No. 12/840,155, filed on Jul. 20, 2010, which is hereby incorporated by reference.

In short, the information element of a beacon frame is used by a station to broadcast to an access point within its reception range, the station's position data and an associated quality estimate. This position data can either be broadcasted at regular intervals through beacon frames. Alternatively, a probe request can be issued by either the station or access point to obtain this position data and quality estimate. A station receiving the probe request would reply with its position data and/or quality estimate.

In the case where the location unaware access point is associated with one location aware station at the initial time step, the location of that location aware station is used as the initial state estimate $\hat{x}_0$. The initial state error covariance can be based on the quality estimate or the maximum range of the access point. In the case where the access point is associated with more than one location aware station, the initial state estimate can be a weighted average of the locations of the location aware stations. The weights can be based on the received signal strength of the power of an incoming signal from the location aware station or any other signal quality measurement. Alternatively, the weights can be based on timing measurements from the location aware stations. Examples of such timing measurements are without limitation, the classic time of arrival (TOA) measurements, round trip time (RTT) measurements, and observed time difference (OTD) measurements. In another embodiment, the weights can be any combination of the signal quality and/or timing measurements. In yet another embodiment where the location unaware access point is associated with more than three location aware stations, the initial state estimate can be determined using any one of the well known batch processed least-squares techniques.

Figure 6:
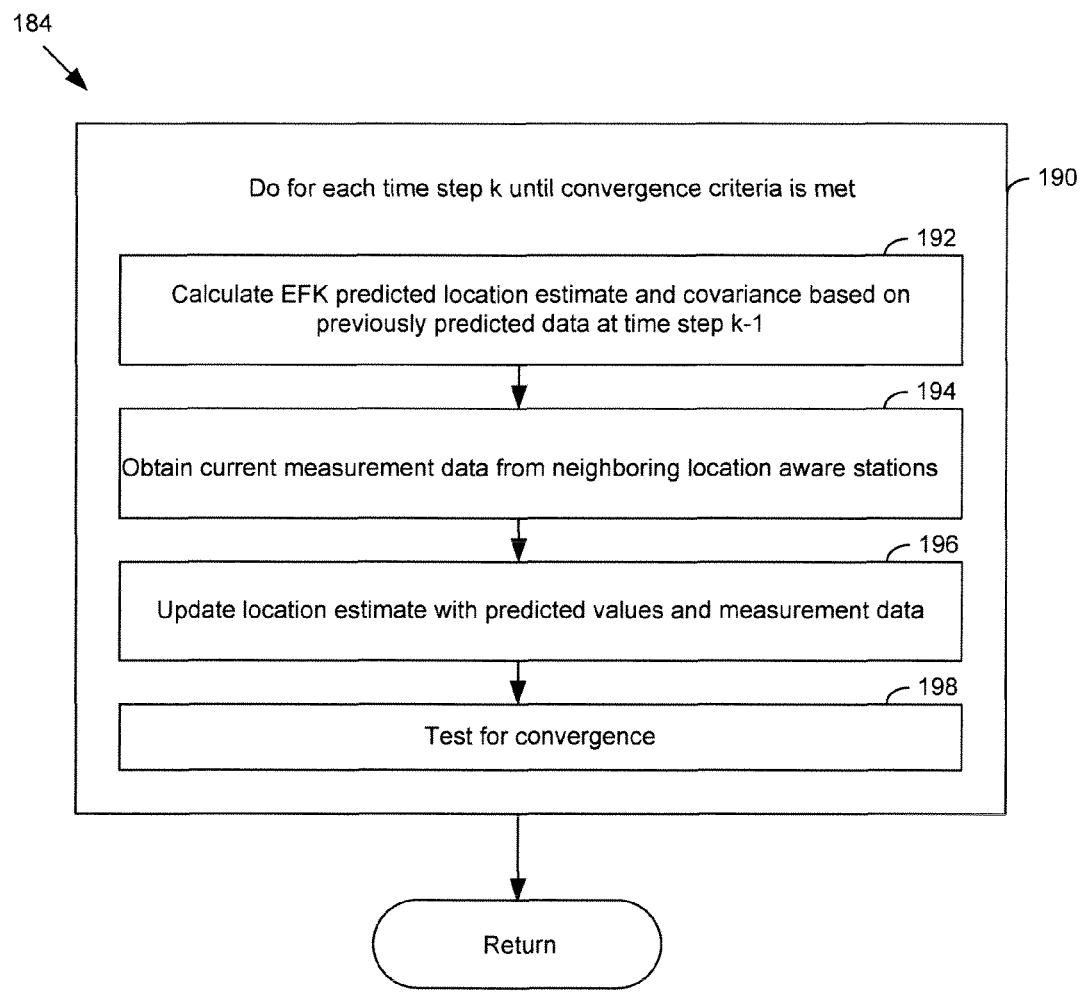
FIG. 6 is an exemplary flow diagram illustrating a method for refining a location estimate in accordance with some embodiments.

Next, the initial state estimate is refined by using the EKF to estimate the location of the access point (step 184). FIG. 6 depicts the steps used to estimate the location within a predetermined error tolerance. Referring to FIG. 6, the EKF iterates for each time step k until the process converges (step 190). At step 192, the EKF calculates a predicted location estimate and its covariance as described above with respect to equations (1) and (2) above. Step 192 is the predict phase of the EKF which was described above.

In step 194, the EFK obtains measurement data from its location aware stations. In embodiments where the position is represented as the tuple (x, y), the measurement data can be represented mathematically as follows:

$$z_{k_i} = h_i(x_k)$$
$$= \sqrt{(x_k - x_{s_i})^2 + (y_k - y_{s_i})^2} + v_{k_i}$$

where $(x_k, y_k)$ represents the coordinates of the location unaware access point at time k,
$(x_{s_i}, y_{s_i})$ represents the coordinates of the station i at time k, for all i within range of the location unaware access point, and $v_{k_i}$ is the measurement noise which is assumed to be zero mean Gaussian white noise with a variance $R_{k_i}$ and the function $h_i$ is differentiable with respect to the state.

The access point can obtain this measurement data in any one of a number of ways. In some embodiments, the measurement data can be derived from timing measurements obtained from location aware stations. These timing measurements can be any one of the classic time of arrival (TOA) measurements, round trip time (RTT) measurements, and observed time difference (OTD) measurements.

In some other embodiments, the range or distance measurement data can be derived from more advanced measurements such as those described in U.S. patent application entitled, Synchronization-Free Station Locator In Wireless Network, assigned to Atheros Communications Inc., filed on Sep. 3, 2009 with application Ser. No. 12/553,757, which is hereby incorporated by reference. In short, this patent application provides several different embodiments for determining the distance or range of a station from an access point. In some embodiments, the access point sends a unicast to a station and notes its time of departure (TOD). The station receives the unicast packet and notes its time of arrival TOA (D). The station sends an acknowledgment packet back to the access point and notes its time of departure TOD(D_ACK). The access point receives the acknowledgment packet and notes its time of arrival, TOA(D_ACK). The distance between the access point and the station can be determined using a first difference between the TOA(D_ACK) and the TOD(D) and a second difference between the TOD(D_ACK) and the TOA(D). Other embodiments described in this patent application can also be used to obtain the range measurement data in step 194.

Next in step 196, the EKF updates the predicted state estimate and covariance with the measurement data as described above with respect to equations (3)-(7) above. Step 196 is the update phase of the EKF which was described above.

The process tests for convergence in step 198. The EKF converges when the difference between the state estimate at the current time step k and the state estimate at the previous time step k−1 is within a user-defined error tolerance. Mathematically, the EKF converges when the following condition occurs: $|\hat{x}_k - \hat{x}_{k-1}| < \epsilon$, where $\epsilon$ is a user-defined error tolerance. If the convergence criterion is not met, then the EKF proceeds through another iteration of steps 192-198 for the next time step. Otherwise, if the convergence criterion is satisfied, then the current state estimate is deemed the location of the access point.

Referring back to FIG. 5, the procedure 140 determines a test statistic for use in detecting the movement of the access point after its location has been determined (step 186). In general, the test statistic can be defined mathematically, as follows:

$$t_k = \tilde{y}_k^T S_k^{-1} \tilde{y}_k, \qquad (8)$$

where k is the time step of convergence.

Referring back to FIG. 4, once the location unaware access point knows its location, the location unaware access point can participate in assisting other stations in their self-positioning determinations (step 170). The location unaware access point can assist other stations or access points by either broadcasting its location or by responding to probe requests with its location. As noted above, a location unaware access point transmits beacon frames at regular intervals. In these beacon frames, the location unaware access point's position data and quality estimate can be transmitted. Stations within the reception range of the beacon frame can receive the location unaware access point's position and quality estimate. Alternatively, the location unaware access point can respond to a probe request requesting its position.

In addition, the location unaware access point tracks for any movement which would indicate that the location unaware access point needs to re-determine its position (step 170). In some embodiments, monitoring the movement of the location is performed using chi-square testing. In using this technique, the procedure 140 is always testing a null hypothesis which states that there is no significant difference between the test statistic (i.e., expected state) and the current measured state. This testing is performed by determining whether the test statistic, $t_k$, falls in a confidence region $(1-\alpha)$ for a Chi-square random variable with $n_k$ degrees of freedom. The confidence level, $\alpha$, is a user-defined parameter. Given a user-defined threshold, $\chi^2_\alpha$, for a particular confidence level $\alpha$, the hypothesis test tests where the test statistic $t_k$ lies relative to the user-defined threshold, $\chi^2_\alpha$. The absence of movement is indicated when $t_k < \chi^2_\alpha$ and movement is detected when $t_k > \chi^2_\alpha$.

Figure 7:
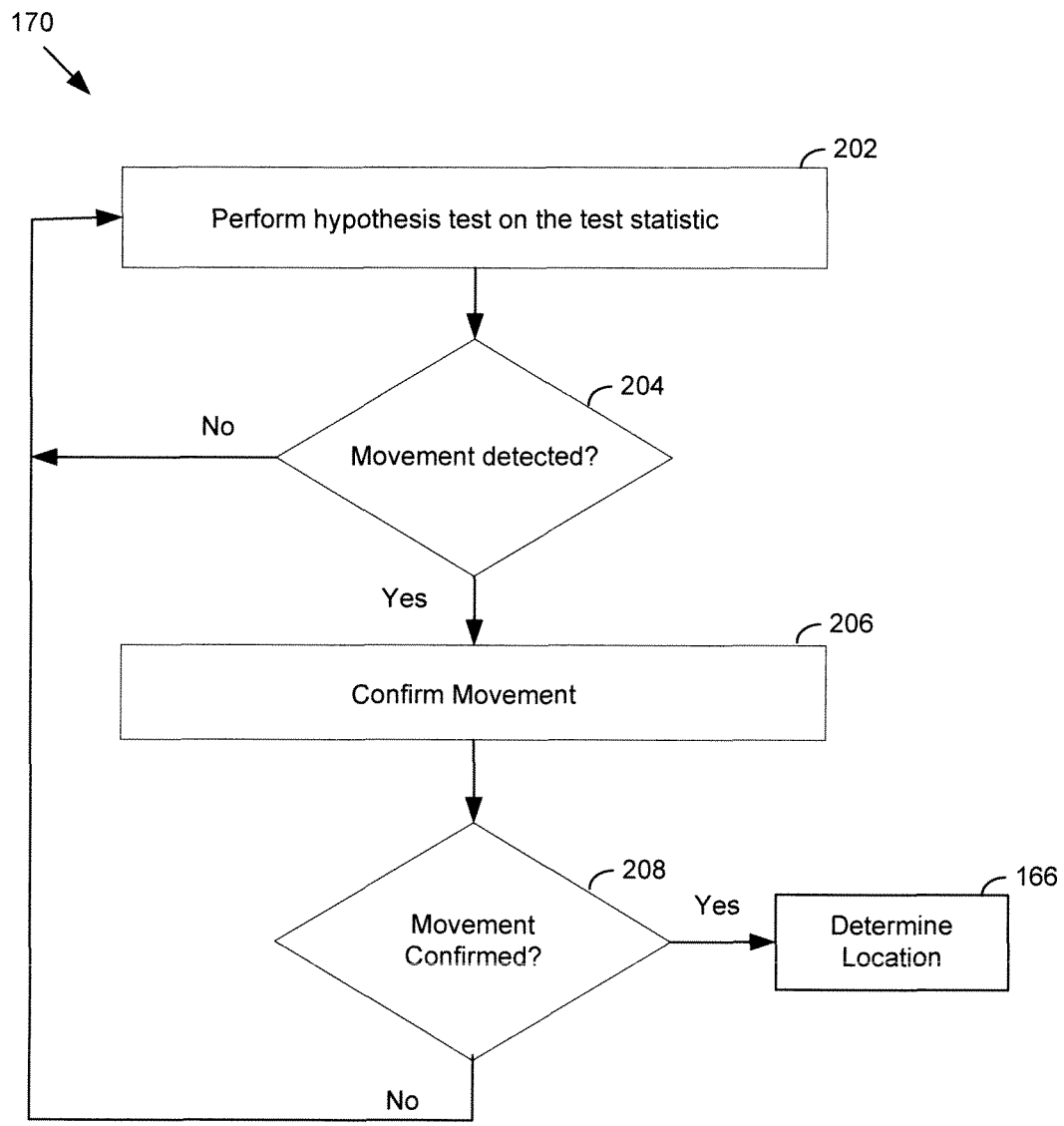
FIG. 7 is an exemplary flow diagram illustrating a method for detecting the movement of a wireless station in accordance with some embodiments.

Referring to FIG. 7, in step 202, the hypothesis test is performed on the test statistic by determining whether $t_k < \chi^2_\alpha$ or $t_k > \chi^2_\alpha$. In the event movement is not detected (step 204—No), the procedure 170 tests the hypothesis again (step 202). This test can be performed randomly, continuously, or at user-defined intervals.

In the event movement is detected (step 204—Yes), the procedure 170 confirms that the movement has occurred (step 206). A single test statistic at time k may not be sufficient to confirm that the location unaware access point has been displaced. Confirmation of the movement can be determined by formulating the test statistic as a combination of several test statistics within a time interval [k, k+N−1], where N is the number of additional time steps, and k is the time step at which the hypothesis test first failed. This new test statistic can be the average of the test statistics taken within the time interval [k, k+N−1]. In step 208, confirmation of the movement is determined by testing the average of the test statistics taken within the time interval [k, k+N−1] relative to the user-defined threshold $\chi^2_\alpha$, for a particular confidence level $\alpha$. If movement is confirmed (step 208—Yes), then a new location is determined in the manner explained above (step 166). Otherwise, if the movement is not confirmed (step 208—No), then the procedure 170 continues to track for any other movements (step 202).

The process described above is repeated continuously during the operation of the access point. Alternatively, the process can be invoked to execute at predetermined time intervals to track the location of the access point and to re-compute the location as needed. In the event the access point is powered down, the process will restart from the beginning.

In some embodiments, the location unaware access point may utilize a location server 108 to obtain and store the locations of the location aware stations in a reference database 158. The location server 108 can use any of the techniques described herein in addition to other well-known techniques to obtain the locations of the location aware stations. In addition, the location server 108 can be used to track the movement of these stations using the techniques described herein or through other means and store the updated locations in the reference database 158. The self-positioning location procedure 140 can obtain the locations and/or measurement data from the location server 108.

In some embodiments, an access point 102 may be equipped with a satellite receiver but may not be using the satellite data to determine its location. The access point 102 can be buried in an indoor location where the satellite signal reception is blocked or can be experiencing other problems that affects the reception of the satellite data. In these situations, the access point 102 may employ the technology described herein to learn its location and to continuously refine its location based on the locations of its location aware stations.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and in practical applications, to thereby enable others skilled in the art to best utilize the invention and various embodiments with various modifications as are suited to the particular use contemplated. It is intended that the scope of the invention be defined by the following claims and their equivalents.

I claim:

1. A system comprising:
one or more location aware stations, each having a known location;
a location unaware access point in wireless communication with the one or more location aware stations, the location unaware access point having an unknown location, wherein the location unaware access point includes a non-transitory computer readable medium that store instructions, which when executed, cause the location unaware access point to:
determine a coarse location estimate for the location unaware access point based on one or more known locations of the one or more location aware stations;
refine the coarse location estimate based on range measurement data obtained from the one or more location aware stations over one or more time periods until the refined coarse location estimate meets an error tolerance; and
use the refined coarse location estimate as a determined location of the location unaware access point.

2. The system of claim 1, wherein the instructions further cause the location unaware access point to estimate the coarse location estimate based on a weighted average of known locations of the one or more location aware stations.

3. The system of claim 2, wherein the weighted average is based on received signal strength indicators or timing measurements associated with signals received by the location unaware access point from the one or more location aware stations.

4. The system of claim 1, wherein the location unaware access point further comprises an extended Kalman filter (EKF), which refines the coarse location estimate at each of the one or more time periods until the refined coarse location estimate meets the error tolerance.

5. The system of claim 1, wherein the instructions further cause the location unaware access point to:
track a current location of the location unaware access point relative to current locations of the one or more location aware stations and the determined location of the location unaware access point;
determine that the location unaware access point has moved from the determined location; and
calculate a new location of the location unaware access point.

6. The system of claim 5, wherein the instructions further cause the location unaware access point to confirm movement of the location unaware access point from the determined location by sampling range measurements associated with the one or more location aware stations over a second time period.

7. The system of claim 1, wherein the instructions further cause the location unaware access point to:
determine a test statistic associated with the determined location of the location unaware access point;
use the test statistic to detect movement of the location unaware access point from the determined location; and
confirm the movement of the location unaware access point from the determined location by formulating the test statistic as a combination of several test statistics within a time interval.

8. The system of claim 7, wherein movement of the location unaware access point from the determined location is detected by comparing the test statistic to a threshold based on a confidence level.

9. The system of claim 1, wherein each known location is a position within one of a satellite positioning system and a wireless communication positioning system.

10. An access point comprising:
a wireless receiver for receiving location and measurement data from one or more location aware stations; and
a processor coupled to the wireless receiver, wherein the processor is configured to iteratively determine location estimates of the access point over a plurality of time steps based on the location and measurement data received from the one or more location aware stations, wherein the processor determines a location of the access point based on successive location estimates differing by less than a threshold.

11. The access point of claim 10, wherein the processor is configured to determine an initial one of the location estimates based on a weighted average of the location and measurement data received from the one or more location aware stations.

12. The access point of claim 11, wherein the processor is configured to weight the received location and measurement data based on signal quality associated with the received location and measurement data.

13. The access point of claim 11, wherein the processor is configured to weight the received location and measurement data based on timing measurements associated with the received location and measurement data.

14. The access point of claim 10, wherein the processor utilizes an extended Kalman filter (EKF) to determine the location estimates.

15. The access point of claim 14, wherein the extended Kalman filter is configured to calculate covariances associated with the location estimates.

16. The access point of claim 10, wherein the threshold comprises a user-defined error tolerance.

17. The access point of claim 10, further comprising a wireless transmitter coupled to the processor, wherein the processor is configured to transmit the determined location of the access point to the wireless transmitter.

18. The access point of claim 17, wherein the processor includes the determined location of the access point in beacon frames transmitted to the wireless transmitter.

19. The access point of claim 10, wherein the processor is configured to monitor movement of the access point from the determined location of the access point.

20. The access point of claim 19, wherein the processor is configured to confirm a detected movement of the access point from the determined location of the access point over a plurality of time steps.

21. The access point of claim 19, wherein the processor is configured to monitor movement of the determined location of the access point in response to the received location and measurement data.

* * * * *